United States Patent
Hamaguchi et al.

(10) Patent No.: US 7,523,335 B2
(45) Date of Patent: Apr. 21, 2009

(54) JOB PROCESSING APPARATUS WITH POWER SEQUENCE RESPONSIVE TO DETECTING EXTERNAL JOB DATA SIGNAL

(75) Inventors: Kazuya Hamaguchi, Nara (JP); Masanori Nakazawa, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 438 days.

(21) Appl. No.: 11/354,458

(22) Filed: Feb. 14, 2006

(65) Prior Publication Data

US 2006/0184810 A1     Aug. 17, 2006

(30) Foreign Application Priority Data

Feb. 15, 2005   (JP) ............... 2005-037732

(51) Int. Cl.
*G06F 1/26* (2006.01)
(52) U.S. Cl. .......................... 713/324; 399/88
(58) Field of Classification Search ............. 399/88; 713/324
See application file for complete search history.

(56) References Cited

U.S. PATENT DOCUMENTS 5,457,516 A * 10/1995 Kim .................... 399/37
6,308,278 B1 * 10/2001 Khouli et al. ........... 713/323
6,822,764 B1 * 11/2004 Okabe et al. ........... 358/442

FOREIGN PATENT DOCUMENTS

| JP | 10-185965 | 7/1998 |
|---|---|---|
| JP | 2002-271596 | 9/2002 |
| JP | 2002-344673 A | 11/2002 |
| JP | 2003-228444 | 8/2003 |
| JP | 2004-289451 A | 10/2004 |

* cited by examiner

*Primary Examiner*—Thomas Lee
*Assistant Examiner*—Albert Wang
(74) *Attorney, Agent, or Firm*—Edwards Angell Palmer & Dodge LLP; David G. Conlin; William J. Daley, Jr.

(57) ABSTRACT

A job processing apparatus has a signal detecting section, a signal analyzing section, a job processing section, a main power supply portion, a first auxiliary power supply portion, a second auxiliary power supply portion, and a power control section. The main power supply portion supplies power to the job processing section. The first auxiliary power supply portion supplies power to the signal analyzing section. The first auxiliary power supply portion is smaller than the main power supply portion in power supplying amount. The second auxiliary power supply portion supplies power to the signal detecting section. The second auxiliary power supply portion is smaller than the main power supply portion in power supplying amount. The power control section, in power saving operation mode, switches off the main power supply portion and the first auxiliary power supply portion respectively.

16 Claims, 8 Drawing Sheets

JOB PROCESSING APPARATUS WITH POWER SEQUENCE RESPONSIVE TO DETECTING EXTERNAL JOB DATA SIGNAL

CROSS REFERENCE

This Nonprovisional application claims priority under 35 U.S.C. § 119(a) on Patent Application No. 2005-037732 filed in Japan on Feb. 15, 2005, the entire contents of which are hereby incorporated by reference.

BACKGROUND OF THE INVENTION

The present invention relates to a job processing apparatus for performing jobs in accordance with input job data, and particularly to a job processing apparatus configured to operate in one of operation modes including normal operation mode and power saving operation mode.

In order to reduce power consumption of such job processing apparatuses, it is important to control power supply in period during which no job data is input thereto. In other words, it is necessary to reduce standby power consumption to a minimum level. On the other hands, job processing apparatuses, even during standby time, need to be responsive to external input signal for performing job in accordance with job data input thereto.

Japanese Patent Application Laid-Open No. 2003-228444 discloses a power supply device employing a power control method in which a main power supply section is turned off after a predetermined period of time during which no signal is input thereto. The power supply device said to be responsive to external input signal in the power saving operation mode, because power is supplied, in the power saving operation mode, to a circuit that detects external signal.

The power supply device, however, sometimes unnecessarily switches to the normal operation mode from the power saving operation mode, thereby causing extra power consumption. For example, the power supply device, in the power saving mode, always turns on the main power supply portion upon detection of external input signal relating to job data. But sometimes there exists a situation in which it is not necessary for the power supply device to turn on the main power supply portion for handling external input signal. In such situation, turning on the main power supply portion cause an increase of power consumption.

A feature of the present invention is to offer a job processing apparatus configured to reduce standby power consumption by preventing the main power supply portion from being turned on unnecessarily.

SUMMARY OF THE INVENTION

A job processing apparatus is configured to operate in one of operation modes including normal operation mode and power saving operation mode. The job processing apparatus has a signal detecting section, a signal analyzing section, a job processing section, a main power supply portion, a first auxiliary power supply portion, a second auxiliary power supply portion, and a power control section.

The signal detecting section is adapted to detect external input signal relating to job data. The signal analyzing section is adapted to analyze the external input signal detected by the signal detecting section. The job processing section is configured to perform job in accordance with job data input thereto.

The main power supply portion is adapted to supply power to the job processing section. The first auxiliary power supply portion is adapted to supply power to the signal analyzing section. The first auxiliary power supply portion is smaller than the main power supply portion in power supplying amount. The second auxiliary power supply portion is adapted to supply power to the signal detecting section. The second auxiliary power supply portion is smaller than the main power supply portion in power supplying amount.

The power control section is configured to switch on or off the main power supply portion and the first auxiliary power supply portion respectively. The power control section, in power saving operation mode, switches off the main power supply portion and the first auxiliary power supply portion respectively.

The job processing apparatus is capable of analyzing external input signal with the signal analyzing section without power supply operation of the main power supply portion. This is because the signal analyzing section is supplied power from the first auxiliary power supply portion.

Power supply operation of the main power supply portion and the first auxiliary power supply are switched on/off respectively, by the power control section, according to current operation mode of the job processing apparatus. The second auxiliary power supply portion is kept operating regardless of operating mode of the job processing apparatus. The second auxiliary power supply portion enables the signal detecting section to be responsive to external input signal.

The configuration enables the signal analyzing section to analyze the external input signal before turning on the main power supply circuit, thereby ensuring that the main power supply portion is turned on only when the main power supply portion's operation is necessary for handling external input signal input.

For example, it is not necessary to turn on the main power supply portion when external input signal relates to jobs that do not involve the job processing section's operation. Examples of the jobs include, but are not limited to a nighttime facsimile receipt, a facsimile receipt through the Internet, and a hold print job in which the image date is not printed but stored in a memory. On the other hands, it is necessary to turn on the main power supply portion when external input signal relates to jobs that involve the job processing section's operation such as image forming process.

DETAILED DESCRIPTION OF THE INVENTION

Referring to the FIGS. 1 to 5, described below is a facsimile device 1A according to a first embodiment of the present invention.

Figure 1:
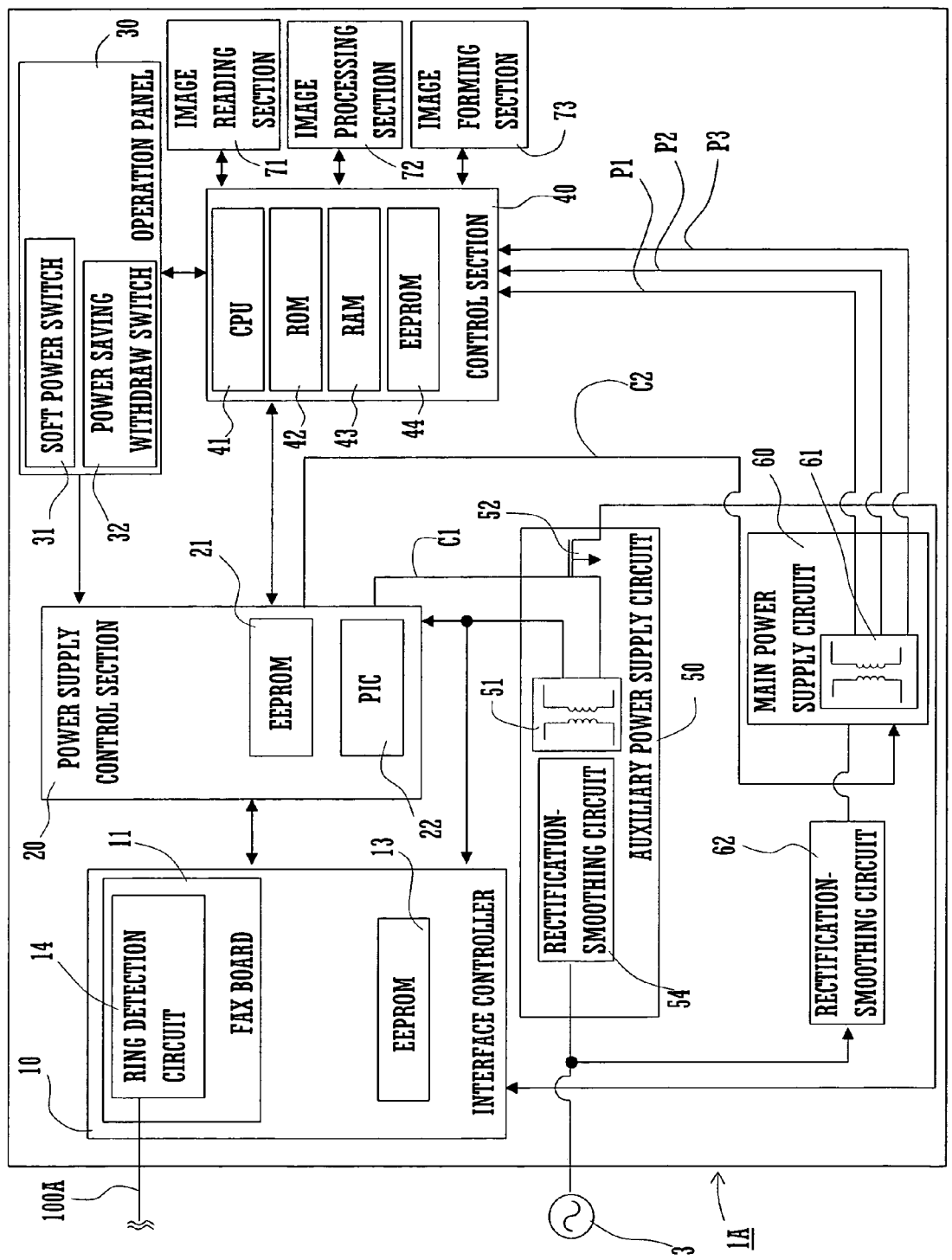
FIG. 1 is a block diagram illustrating a configuration of a facsimile device according to a first embodiment of the present invention.

As shown in FIG. 1, the facsimile device 1A has an interface controller 10, a power supply control section 20, an operation panel 30, a control section 40, a main power supply circuit 60, an auxiliary power supply circuit 50, an image reading section 71, an image processing section 72, and an image forming section 73.

The interface controller 10 includes a FAX board 11 having a ring detection circuit 14, and an EEPROM 13. The FAX board 11 is connected to a public line 100A through the ring detection circuit 14.

The power supply control section 20 has an EEPROM 21 and a PIC (Peripheral Interface Controller) 22 ("PIC" is a trademark). The EEPROM 22 stores therein programs necessary for the PIC 22's operations. The PIC 22 is configured to output a signal to control power supply operation of the main power supply operation of the main power supply circuit 60 and the auxiliary power supply circuit 50. The PIC 22 also configured to control the facsimile device 1A's storing operation for input FAX data.

The operation panel 30 has a soft power switch 31 and a power saving withdraw switch 32. The soft power switch 31 is configured to switch on/off the facsimile 1A. The power saving withdraw switch 32 is configured to cause the facsimile device 1A to return from the power saving operation mode to the normal operation mode. Operation keys provide with the operation panel 30 are not limited to the soft power switch 31 and the power saving withdraw switch 32, thus other operation keys may be provided to the operation panel 30.

The control section 40 sets the facsimile device 1A to either a normal operation mode or a power saving operation mode. In the normal operation mode, the facsimile device 1A operates normally, and in the power saving operation mode, the facsimile device 1A is adapted to operate with minimum power consumption. The control section 40 has overall control of operations of each of the components of the facsimile device 1A.

The control section 40 has a ROM 42, a RAM 43, an EEPROM 44, and a CPU 41. The ROM 42 stores therein programs necessary for the facsimile device 1A's operations. The RAM 43 is a volatile memory for storing data temporarily. The EEPROM 44 stores therein configuration information of the facsimile device 1A. The CPU 41 is configured to control components of the facsimile device 1A in accordance with programs stored in the ROM 42.

The main power supply circuit 60 supplies power to each of the components including the control section 40 in the normal operation mode. The main power supply circuit 60 is connected to a commercial power supply 3 through a rectification-smoothing circuit 62. The main power supply circuit 60 is connected to the control section 40 thorough power supply lines P1 to P3. The main power supply circuit 60 is also connected to the power supply control section 20 thorough a control line C2. The main power supply circuit 60 has a switching transformer 61. The switching transformer 61 starts its oscillation when provided with a low-level signal through the control line C2 and stops its oscillation when provided with a high level signal.

The auxiliary power supply circuit 50 has a rectification-smoothing circuit 54, a switching transformer 51, and a P-MOS 52. The switching transformer 51 has a first output portion and a second output portion on its secondary side. The first output portion is connected to the FAX board 11 through the P-MOS 52. The first output portion is corresponding to a first auxiliary power supply circuit of the present invention. The second output portion is connected to the ring detection circuit 14 and the power supply control section 20. The second output portion is corresponding to a second auxiliary power supply circuit of the present invention. The P-MOS 52 is connected at its gate to the power supply control section 20 through a control line Cl. Inputting low-level signal to the gate renders the P-MOS 52 conductive, thereby allowing the switching transformer 51 to supply power to the FAX board 11.

The image reading section 71 is configured to read an image to be faxed, and to generate image data based on the image read. The image processing section 72 is configured to performing image data processing in accordance with predetermined procedures. The image forming section 73 is configured to perform an image forming operation according to image data input thereto. In addition, the control section 40 determines whether image forming process after receiving fax is necessary or not base on the configuration information.

Figure 2:
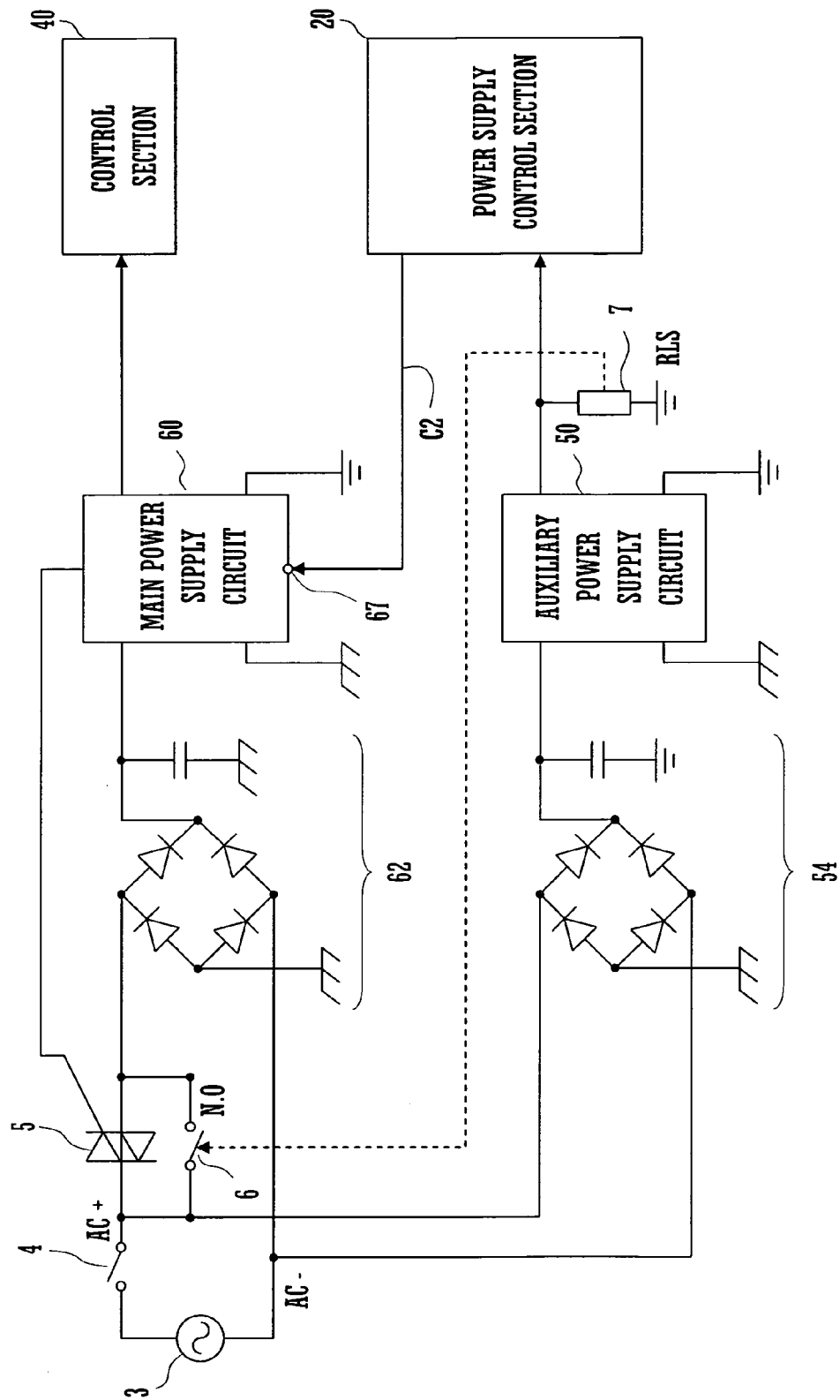
FIG. 2 is a diagram illustrating a configuration of a power supply circuits of the facsimile device.

As shown in FIG. 2, a commercial power supply 3 is connected to the auxiliary power supply circuit 50 through a main switch 4 and a rectification-smoothing circuit 54. The main switch 4 is a switch for switching on/off the main power supply of the facsimile 1A. The rectification-smoothing circuit 54 provided for rectification and smoothing has a diode bridge and a capacitor. The auxiliary power supply circuit 50 is connected to a grounded relay coil 7 and the power supply control section 20, respectively. The commercial power supply 3 is also connected to the main power supply circuit 60 through the main switch 4, a triac 5, a relay contact 6, and the rectification-smoothing circuit 62. A gate of the triac 5 is connected to the main power supply circuit 60. The relay contact 6 is a normally open relay contact adapted to be switched open/closed by the relay coil 7. The triac 5 and the relay contact 6, connected in parallel, are both connected to the main switch 4 and a rectification-smoothing circuit 62. The rectification-smoothing circuit 62 has the same configuration as the rectification-smoothing circuit 54.

The main power supply circuit 60 is provided with an Control signal input terminal 67. To the control signal input terminal 67, a low-level signal to switch on the main power supply circuit 60, and a signal to switch off the main power supply circuit 60 are input selectively. The main power supply circuit 60 is connected to the gate of the triac 5 and the control section 40, respectively.

Described below is how the facsimile device 1A operates. Turning on the main switch 4 activates the facsimile device 1A. In the activation process, current flows from the commercial power supply 3 to the auxiliary power supply circuit 50 through the rectification-smoothing circuit 54. Then, the auxiliary power supply circuit 50 activates and supplies power to the relay coil 7. Current flowing through the relay coil 7 causes the relay contact 6 to be closed, thereby allowing current flow from the commercial power supply 3 to the main power supply circuit 60 through the relay contact 6 and the rectification-smoothing circuit 62.

Subsequently, the main power supply circuit 60 starts to supply power to the gate of the triac 5, thereby allowing the triac 5 to be kept conductive. The main power supply circuit 60 also starts to supply power to the control section 40, thereby allowing the facsimile device 1A to initiate operations.

Figure 3:
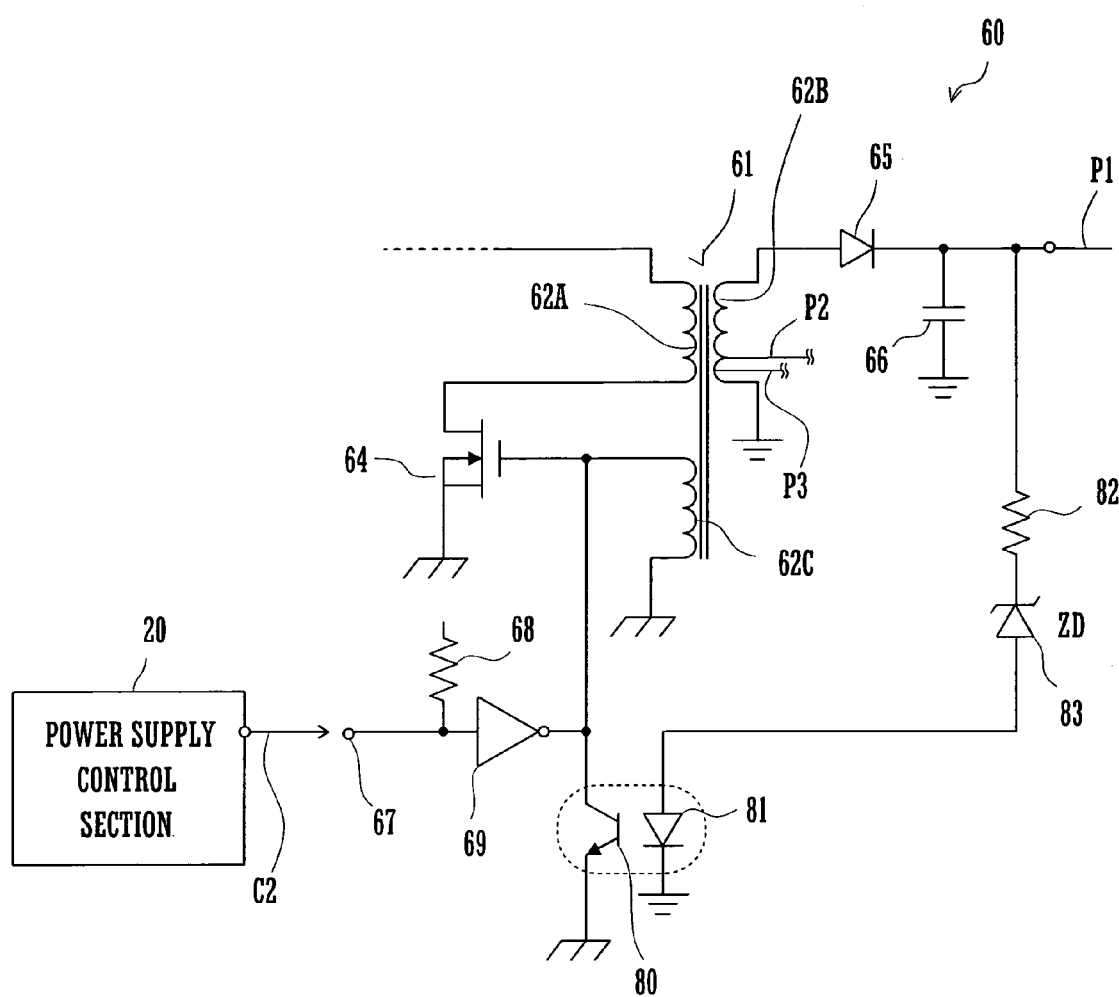
FIG. 3 is a diagram illustrating a configuration of principal parts of a main power supply circuit of the facsimile device.

As shown in FIG. 3, the main power supply circuit 60 is provided with a switching transformer having a first primary winding 62A, a second primary winding 62C, and a secondary winding 62B. The first primary winding 62A is connected to the rectification-smoothing circuit 62 and a switching transistor 64. The secondary winding 62B is connected to an anode of a diode 65. A cathode of the diode 65 is connected to a grounded capacitor 66 and a power supply terminal. A connection midway between the capacitor 66 and the power supply terminal is grounded through a resistor 82, a zener diode 83, and a light-emitting diode 81.

A gate of the switching transistor 64 is connected to the second primary winding 62C and a phototransistor 80 with a grounded emitter. A collector of the phototransistor 80 is connected to the control signal input terminal 67 through an inverter (open-collector) 69. A connection midway between the Control signal input terminal 67 and the inverter 69 is connected to the auxiliary power supply circuit 50 through a pull-up resistor 68.

When a low-level signal is input to the Control signal input terminal 67, output of the inverter 69 is put in a high-impedance state, thereby causing the gate of the switching transistor 64 to become ungrounded. A valid feedback signal is thus input to the gate of the switching transistor 64 from the first primary winding 62A, thereby causing switching oscillation. The switching oscillation allows power supply from the secondary winding 62B to the control section 40 through the power supply terminal. In addition, the secondary winding 62B is provided with two intermediate taps, thereby supplying to the control section 40 three different value power.

When potential at the connection midway between the capacitor 66 and the power supply terminal reaches a predetermined value, current flows to the light-emitting diode 81 through the resistor 82 and the zener diode 83. Thus, the phototransistor 80 is turned on and the gate of the switching transistor 64 is forced to be grounded, thereby stopping the switching oscillation of the switching transformer 61. The switching on/off of switching oscillation allows sufficient power to be supplied from the main power supply circuit 60 to the control section 40.

When a high-level signal is input to the Control signal input terminal 67, in contrast, the gate of the switching transistor 64 is forced to be grounded. Switching oscillation of the switching transformer 61 is thus stopped.

For example, when a high level signal is input from the power supply control section 20 to the Control signal input terminal 67 in the normal operation mode, switching oscillation of the switching transformer 61 is stopped. When a low-level signal is input from the power supply control section 20 to the Control signal input terminal 67 in the power saving operation mode, switching oscillation of the switching transformer 61 is initiated.

The power supply control section 20 outputs either a low-level signal or a high-level signal to the control signal input terminal 67 according to the operation mode of the facsimile device 1A. With no command input to the facsimile device 1A for more than a predetermined time, the control section 40 outputs a power-save request signal to the power supply control section 20. Upon receipt of the valid power-save request signal, the power supply control section 20 outputs an high-level signals to the control signal input terminal 67 and the gate of the P-MOS 52 respectively.

Figure 4:
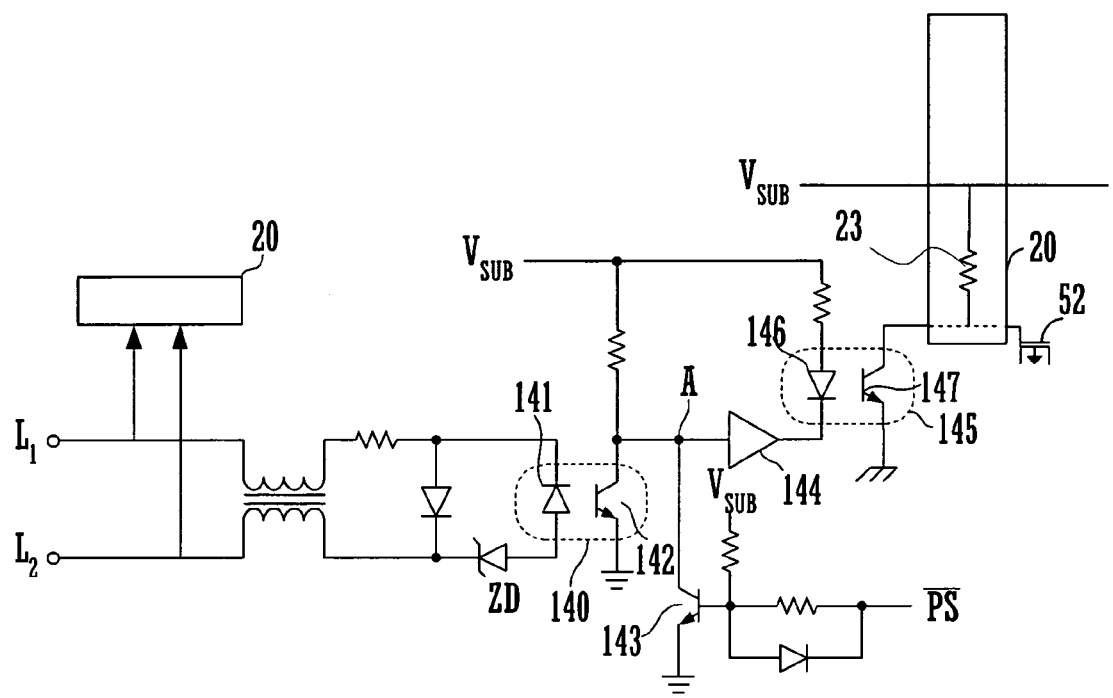
FIG. 4 is diagram illustrating a configuration of principal parts of a main power supply control section.

Illustrated in FIG. 4 is the ring detection circuit 14. The ring detection circuit 14 detects a FAX signal input through a public line as a start-up signal and turns the main power supply circuit 60 on.

As described above, input of a low-level signal to the gate of the P-MOS 52 is required for turning the auxiliary power supply circuit 50 on. An input of a low-level signal to the control signal input terminal 67 is required for turning the main power supply circuit 60 on. With a phototransistor 147 of a photocoupler 145 in a nonconductive state, a high-level signal is input to the gate of the P-MOS 52 through the pull-up resistor 23 disposed in the power supply control section 20.

At this time, with the facsimile device 1A in the normal operation mode, a transistor 143 is in conductive state since potential $V_{SUB}$ of the auxiliary power supply circuit 50 is input to a base of the transistor 143. When the transistor 143 is in conductive state, a connection point A in FIG. 4 has a low-level potential. Current is thus allowed to pass through a light emitting diode 146, so that the phototransistor 147 becomes conductive. Accordingly, a low-level signal is input to the gate of the P-MOS 52, thereby turning the main power supply circuit 60 on.

With the facsimile device 1A in the power saving operation mode, in contrast, low-level $\overline{PS}$ signal is input to the base of the transistor 143. Input of the low-level $\overline{PS}$ signal renders the transistor 143 nonconductive, thereby causing the connection point A to have a high-level potential. The phototransistor 147 thus becomes nonconductive and a high level signal is input to the gate of the P-MOS 52.

Concurrently a high-level signal is output by the power supply control section 20 to the Control signal input terminal 67. The output of the inverter 69 becomes low-level and the gate of the switching transistor 64 is forced to be grounded, so that the main power supply circuit 60 is turned off.

When detecting a predetermined FAX signal input through a public line in the power saving operation mode, as shown in FIG. 4, a light emitting diode 141 of a photocoupler 140 causes a phototransistor 142 to be conductive. The connection point A thus has a low-level potential and the phototransistor 147 of the photocoupler 145 becomes conductive. Since as a result a low-level signal is input to the gate of the P-MOS 52, the interface controller 10 is supplied with power by the auxiliary power supply circuit 50. The interface controller 10 is capable of analyzing inputting FAX signal after being supplied with power by the auxiliary power supply circuit 50.

Figure 5:
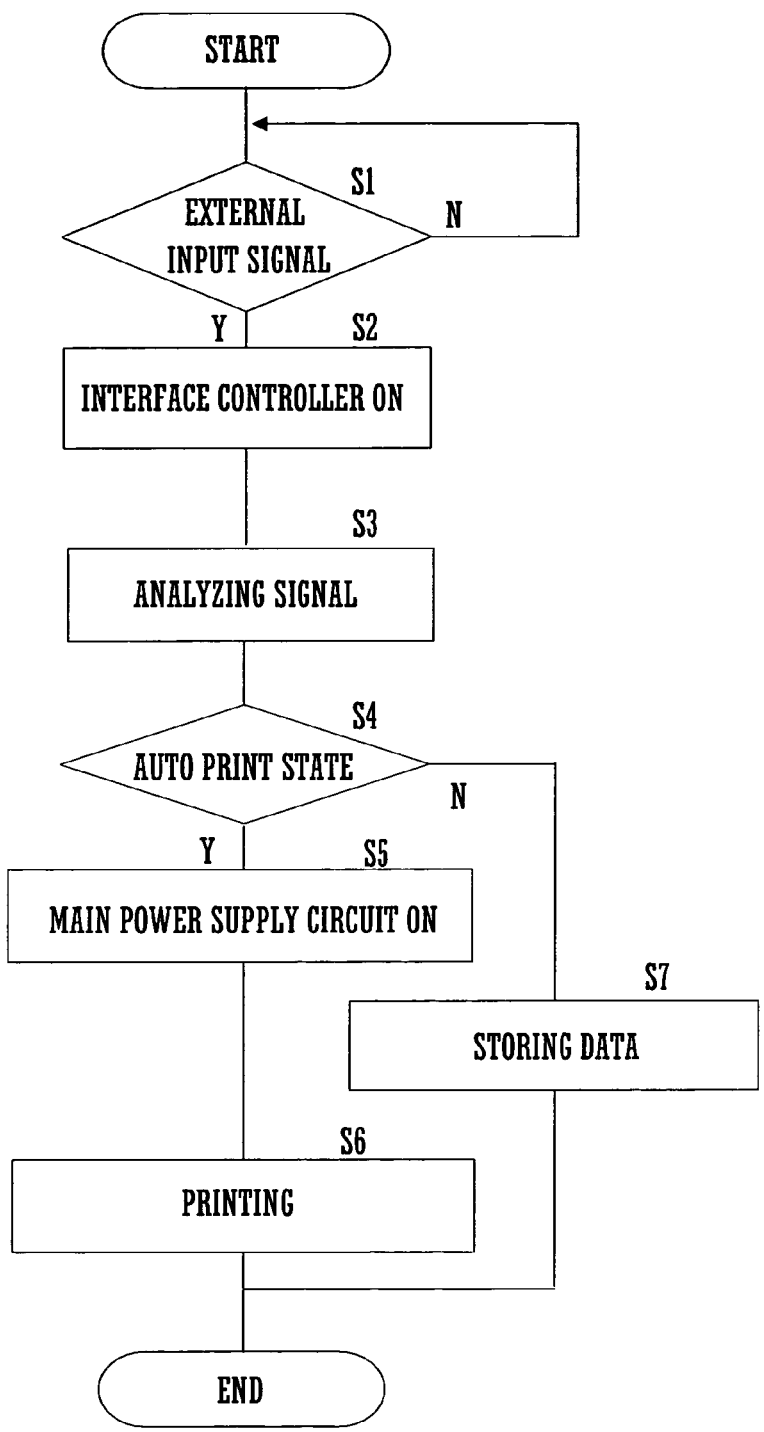
FIG. 5 is a flowchart of a process performed by the main power supply control section in returning to the normal operation mode.

FIG. 5 is a flowchart of a process in the power saving mode, performed by the facsimile device 1A. The facsimile device 1A is held on standby until an external signal is input thereto (step S1). When an external signal is input to the ring detection circuit 14 at step S1, the ring detection circuit 14 provides a low-level signal to the gate of the P-MOS 52 through the power supply control section 20. Accordingly power is supplied from the auxiliary power supply circuit 50 to the interface controller 10 through the P-MOS 52 (step S2). The interface controller 10 starts operating by power supplied by the auxiliary power supply circuit 50. The interface controller 10 analyzes ring signal input to the ring detection circuit 14 (step S3).

Then, the interface controller 10 judges whether the facsimile device is set to "AUTO PRINT STATE" or "MANUAL PRINT STATE" based on the configuration information (step S4). The "AUTO PRINT STATE" is state where the facsimile device 1A prints all FAX data input thereto automatically. The "MANUAL PRINT STATE" is state where the facsimile device 1A stores FAX data input thereto, and does not print FAX data before operator's instruction.

When the facsimile device 1A is set to the "AUTO PRINT STATE" at step S4, the interface controller 10 informs the power supply control section 20 accordingly, then the power supply control section 20 turns on the main power supply circuit 60(step S5). The image forming section 73 perform image forming operation according to the FAX data received after the main power supply circuit 60 turns on.

When the facsimile device 1A is set to the "MANUAL PRINT STATE" at step S4, the interface controller 10 stores received FAX data in the EEPROM 13 (step S7). The facsimile device 1A does not turn on the main power supply circuit 60 in the situation just described, while conventional facsimile devices turn on the main power supply circuit 60 in this situation. Thus, the facsimile device 1A reduces standby power consumption more efficiently than conventional facsimile devices.

Referring to the FIGS. 6 to 8, described below is a MFP 1B according to a second embodiment of the present invention.

Figure 6:
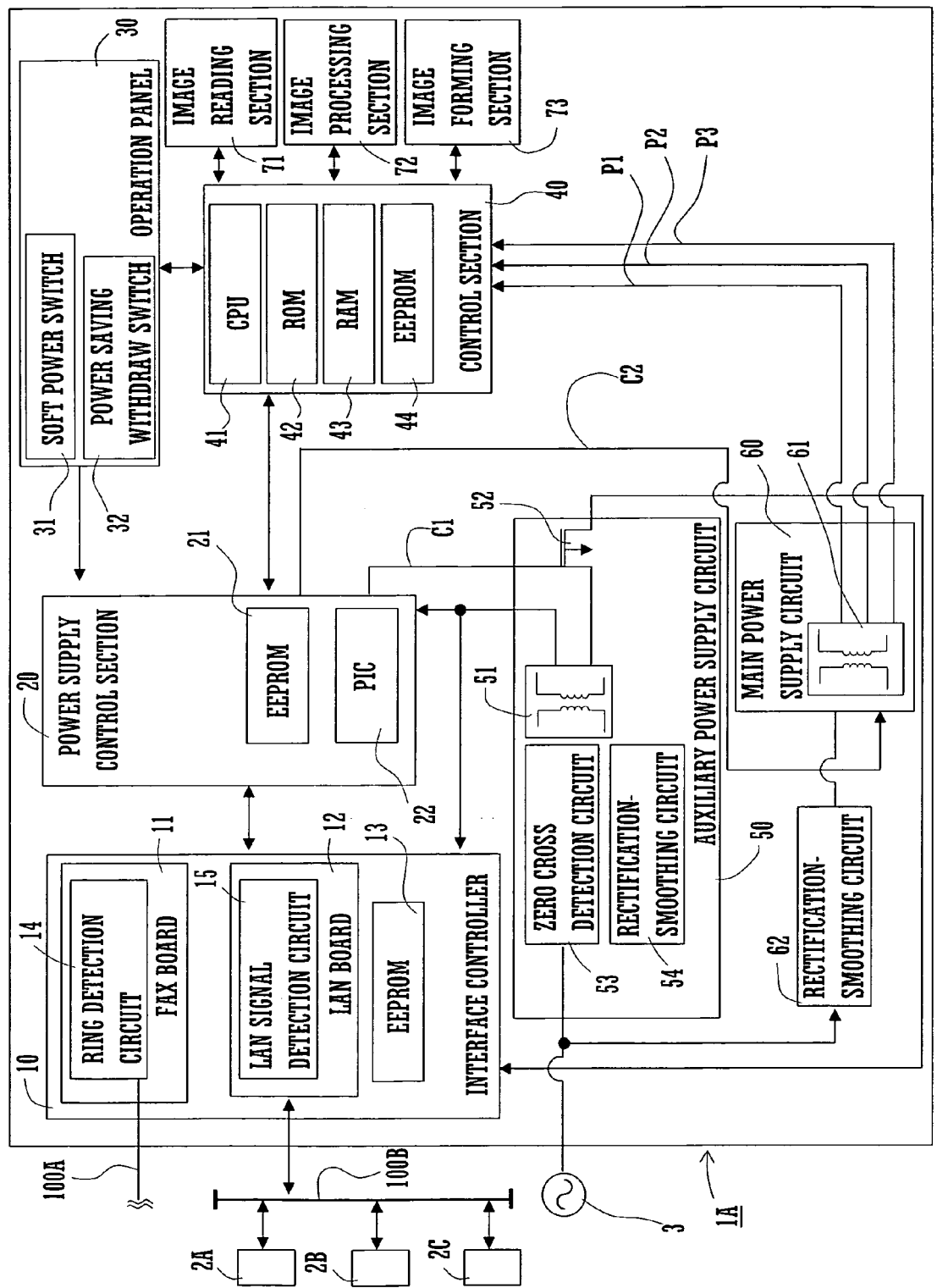
FIG. 6 is a block diagram illustrating a configuration of a MFP (Multi Function Printer) according to a second embodiment of the present invention.

FIG. 6 illustrates a configuration of a MFP 1B according to a second embodiment of the present invention. As illustrated in FIG. 6, The MFB 1B is similar to the facsimile device 1A in basic configuration, thus components corresponding to the first embodiment are provided with the same reference numbers.

The MFP 1B has an interface controller 10, a power supply control section 20, an operation panel 30, a control section 40, a main power supply circuit 60, an auxiliary power supply circuit 50, an image reading section 71, an image processing section 72, and an image forming section 73.

Further, MFP 1B has a LAN board 12 and a zero cross detection circuit 53. The LAN board 12 is disposed in the interface controller 10, and has a LAN signal detection circuit 15. The LAN signal detection circuit 15 is connected to network 100B that is connected to PCs 2A to 2C. The zero cross detection circuit 53 is disposed in the auxiliary power supply circuit 50, and detects Zero Cross Point where line voltage is 0V. The zero cross detection circuit 53 outputs detection signal to the power supply control section 20 when detecting the Zero Cross Point.

Figure 7:
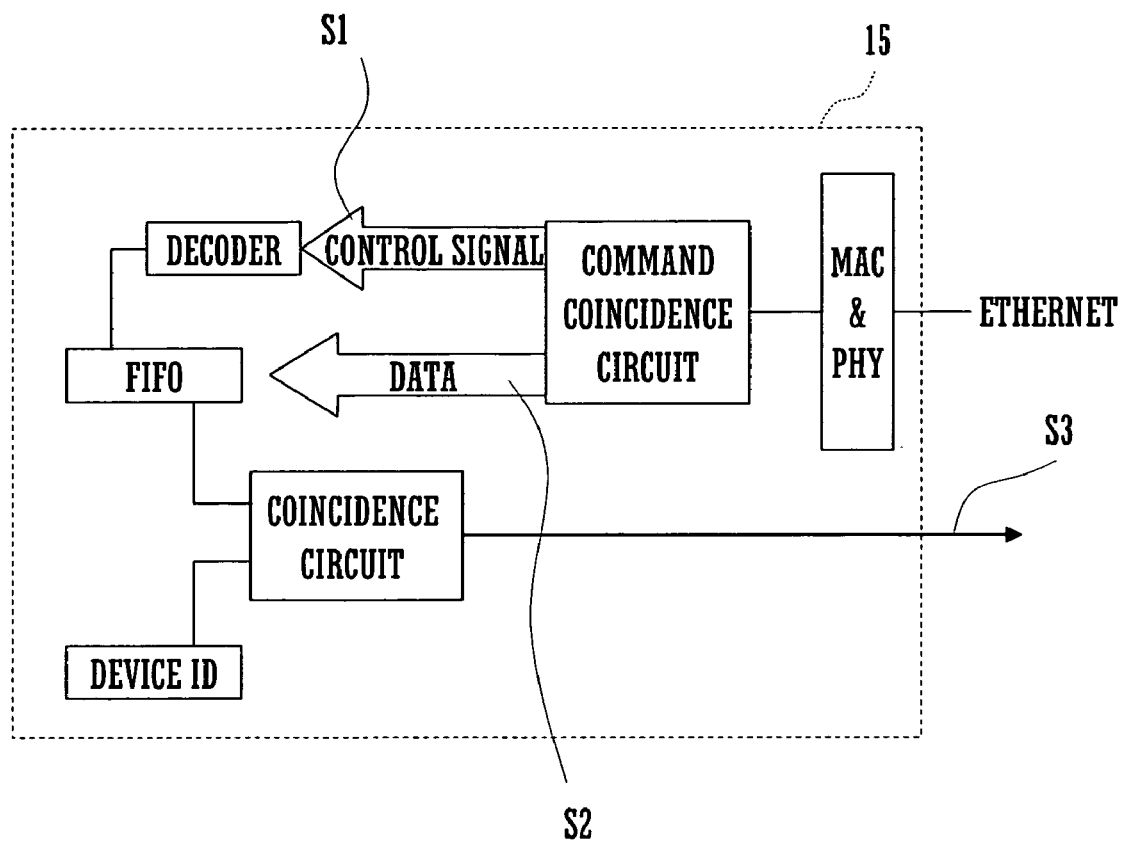
FIG. 7 is block diagram illustrating how a device ID and an ID of a input command are recognized, respectively.

FIG. 7 shows how an ID of a command input through Ethernet ("Ethernet" is a trademark) is recognized in the LAN signal detection circuit 15. As shown in FIG. 7, the LAN signal detection circuit 15 determines whether device ID data S1 included in input data corresponds to pre-registered device ID data S2. The LAN signal detection circuit 15 outputs, if the device ID data match, a start-up signal (low-level signal) S3 the gate of the P-MOS 52.

Figure 8:
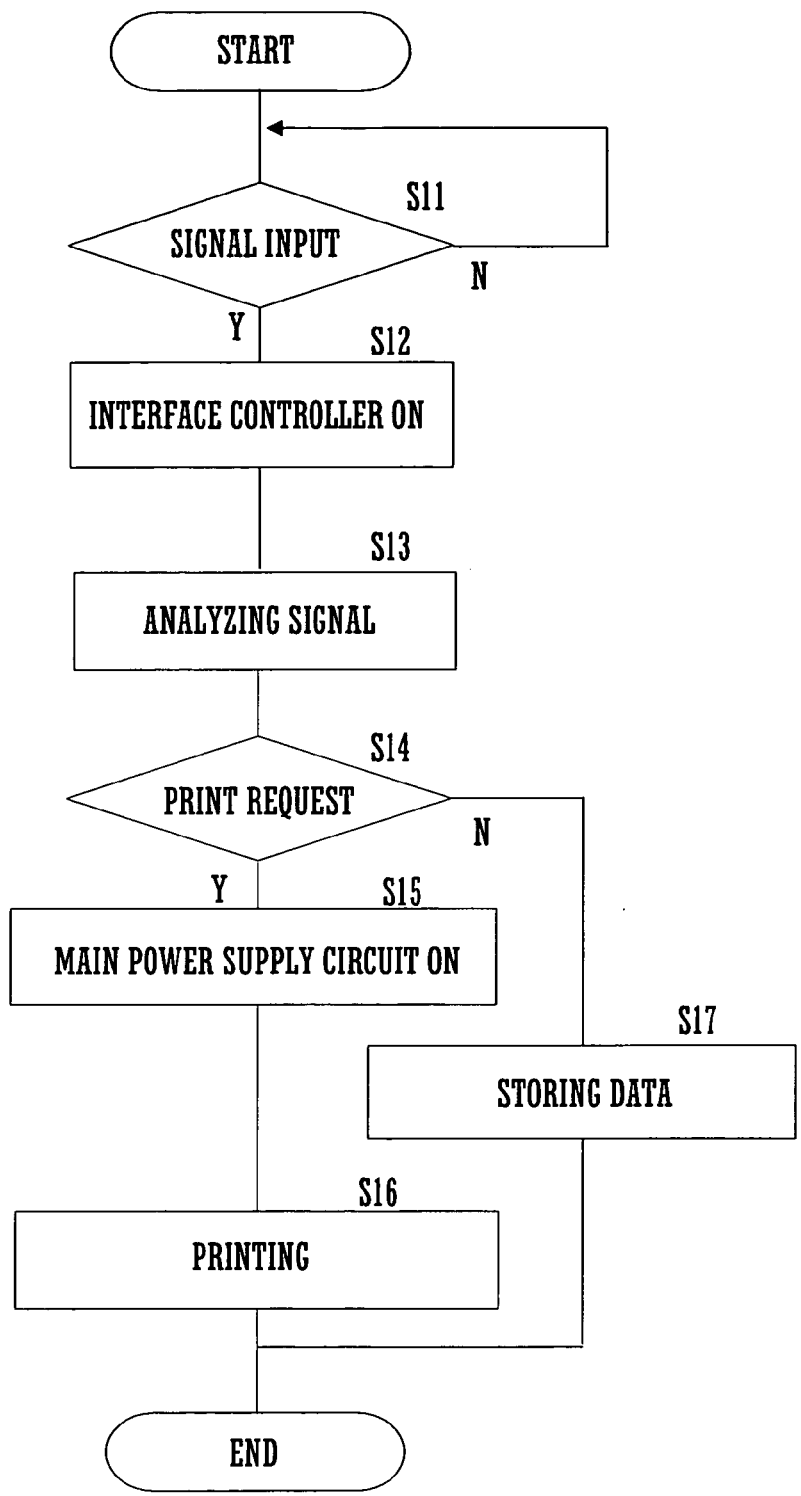
FIG. 8 is a flowchart of a process performed by the main control circuit in returning to the normal operation mode.

FIG. 8 is a flowchart of a process in the power saving mode, performed by the control section 40. Described below is operation performed by the MFP 1B when the MFP 1B receives job data containing image data through the network 100B. The MFP 100B is held on standby until an external signal is input thereto (step S11). When an external signal is input to the LAN signal detection circuit 15 at step S11, to the LAN signal detection circuit 15 outputs a low-level signal to the gate of the P-MOS 52 through the power supply control section 20. Accordingly power is supplied from the auxiliary power supply circuit 50 to the interface controller 10 (step S12). The interface controller 10 starts operating by power supplied by the auxiliary power supply circuit 50. The interface controller 10 analyzes the LAN signal input to the LAN signal detection circuit 15 (step S13).

Then, the interface controller 10 judges whether the inputting job data relates "PRINT JOB" in which print request is included or "HOLD JOB" in which print request is not included (step S14). The "PRINT JOB" is a job involving image forming operation. The "HOLD JOB" is a job involving no image forming operation, such as data storing operation in which an image forming operation is performed after operator's instruction.

When the inputting job relates to a "PRINT JOB" at step S14, the interface controller 10 informs the power supply control section 20 accordingly, then the power supply control section 20 turns on the main power supply circuit 60 (step S15). The image forming section 73 performs an image forming operation according to the job data received after the main power supply circuit 60 turns on.

When the inputting job relates to the "HOLD JOB" at step S14, the interface controller 10 stores the received job data in the EEPROM 13 (step S17). The MFP 1B does not turn on the main power supply circuit 60 in the situation just described, while conventional MFPs turn on a main power supply circuit in this situation. Thus, the MFP 1B reduces standby power consumption more efficiently than conventional MFPs.

Further the MFP 1B is operable for detecting electrical power failure with the zero cross detection circuit 53. The zero cross circuit 53 is an electrical circuit that starts operation with the AC load voltage at close to zero-phase.

The zero cross circuit 53 detects the zero cross point where the line voltage is 0V. With no zero cross point detected for more than a predetermined period of time, the power supply control section 20 determines that the electrical power failure will happen. Accordingly, the power supply control section stores important data in the EEPROM 13 before the MFP 1B turns off. Examples of the important data include, but are not limited to total print number, total rotation time of photoreceptor drum, respective section count values, and configuration information. This feature prevents the MFP 1B from losing important data due to electric power failure.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A job processing apparatus configured to operate in one of a plurality of operation modes including a normal operation mode and a power saving operation mode, the job processing apparatus comprising:

a signal detecting section for detecting an external input signal relating to job data;

a signal analyzing section being configured to analyze the external input signal detected by the signal detecting section;

a job processing section that is configured to perform job processing in accordance with the job data input thereto;

a main power supply portion for supplying power to the job processing section;

a first auxiliary power supply portion for supplying power to the signal analyzing section, the first auxiliary power supply portion being smaller than the main power supply portion in power supplying amount;

a second auxiliary power supply portion for supplying power to the signal detecting section, the second auxiliary power supply portion being smaller than the main power supply portion in power supplying amount;

a power control section that is configured to selectively and separately switch on or off the main power supply portion and the first auxiliary power supply portion respectively;

wherein the power control section is configured to switch off the main power supply portion and selectively switch on or off the first auxiliary power supply portion responsive to the signal detection section, when in the power saving operation mode;

a control section that is configured to control the power control section; and wherein the control section is configured (a) so the first auxiliary power supply portion is switched on in the power saving mode upon detection of the external input signal by the signal detection section so as to turn on the signal analyzing section, and (b) to switch on the main power supply portion selectively according to the analyzing result of the external input signal by the signal analyzing section.

2. The job processing apparatus according to claim 1, wherein the control section is further configured to switch on the main power supply portion in the power saving mode upon detection of external input signal by the signal detection section only when the external signal is determined by the signal analyzing section to involve operation of the job processing section.

3. The job processing apparatus according to claim 2, wherein the job processing section is an image forming section that is configured to perform an image forming process.

4. The job processing apparatus according to claim 3, wherein:

the first auxiliary power supply portion is connected to the signal analyzing section through a transistor; and the power control section is configured to output a signal to the transistor so as to render the transistor conductive when the signal detection section detects an external signal input thereto.

5. The job processing apparatus according to claim 3, wherein the job processing apparatus is configured to operate as a facsimile device, and wherein the power control section includes:

a light emitting diode adapted to be responsive to a ring signal input thereto for emitting light;

a phototransistor adapted to become conductive when receiving light from the light emitting diode; and a circuit configured to render the transistor conductive when the phototransistor is conductive.

6. The job processing apparatus according to claim 3, wherein:

the first auxiliary power supply portion is connected to the signal analyzing section through a transistor; and the power control section is configured to output a signal to the transistor so as to render the transistor conductive when the signal detection section detects an external signal input thereto.

7. The job processing apparatus according to claim 1, further comprising, a zero cross circuit configured to detect a zero cross point where line voltage is 0V, wherein the control section is configured to detect occurrence of electrical power failure based on detection result of the zero cross circuit.

8. The job processing apparatus according to claim 7, further comprising a nonvolatile memory, wherein the control section is configured to store configuration information of the job processing apparatus in the nonvolatile memory when no zero cross point is detected for more than a predetermined period of time.

9. The job processing apparatus according to claim 1, wherein the signal analyzing section provides an output representative of an operating state for the job processing section as a result of the analyzing.

10. A job processing apparatus configured to operate in one of a plurality of operation modes including a normal operation mode and power saving operation mode, the job processing apparatus comprising:

a signal detecting section for detecting an external input signal relating to job data;

a signal analyzing section being configured to analyze the external input signal detected by the signal detecting section;

a job processing section that is configured to perform job processing in accordance with the job data input thereto;

a main power supply portion for supplying power to the job processing section;

a first auxiliary power supply portion for supplying power to the signal analyzing section, the first auxiliary power supply portion being smaller than the main power supply portion in power supplying amount;

a second auxiliary power supply portion for supplying power to the signal detecting section, the second auxiliary power supply portion being smaller than the main power supply portion in power supplying amount;

a power control section that is configured to selectively and separately switch on or off the main power supply portion and the first auxiliary power supply portion respectively, where the power control section switches off the main power supply portion and the first auxiliary power supply portion respectively upon entry into the power saving mode;

a control section that is configured to control the power control section; and wherein the control section is further configured (a) so the first auxiliary power supply portion is switched on in the power saving mode upon detection of the external input signal by the signal detection section so as to thereby turn on the signal analyzing section, and (b) to switch on the main power supply portion selectively according to the analyzing result of the external input signal by the signal analyzing section.

11. The job processing apparatus according to claim 10, wherein the control section is configured to switch on the main power supply portion in the power saving mode upon detection of external input signal by the signal detection section only when the external signal is determined by the signal analyzing section to involve operation of the job processing section.

12. The job processing apparatus according to claim 11, wherein the job processing section is an image forming section that is configured to perform an image forming process.

13. The job processing apparatus according to claim 12, wherein:

the job processing apparatus is configured to operate as a facsimile device, and the power control section includes:

a light emitting diode adapted to be responsive to a ring signal input thereto for emitting light;

a phototransistor adapted to become conductive when receiving light from the light emitting diode;

a circuit configured to render the transistor conductive when the phototransistor is conductive.

14. The job processing apparatus according to claim 10, further comprising, a zero cross circuit that is configured to detect a zero cross point where line voltage is 0V, wherein the control section is configured to detect occurrence of electrical power failure based on detection result of the zero cross circuit.

15. The job processing apparatus according to claim 14, further comprising a nonvolatile memory, and wherein the control section is configured to store configuration information of the job processing apparatus in the nonvolatile memory when no zero cross point is detected for more than a predetermined period of time.

16. The job processing apparatus according to claim 10, wherein the signal analyzing section provides an output representative of an operating state for the job processing section as a result of the analyzing.

* * * * *